United States Patent [19]

Sheffield

[11] Patent Number: 4,884,962
[45] Date of Patent: Dec. 5, 1989

[54] MULTIPLE SPREW BAR STACK MOLD
[75] Inventor: James Sheffield, Alliston, Canada
[73] Assignee: Izon Industries Inc., Rexdale, Canada
[21] Appl. No.: 206,307
[22] Filed: Jun. 14, 1988
[51] Int. Cl.⁴ ............................................. B29C 45/12
[52] U.S. Cl. ................................. 425/234; 264/297.2;
    264/297.7; 264/328.8; 425/567; 425/572;
    425/574; 425/581; 425/588
[58] Field of Search ............... 264/297.2, 297.7, 328.8;
    425/234, 330, 567, 569, 572, 573, 574, 581, 588

[56] References Cited
U.S. PATENT DOCUMENTS
3,417,433 12/1968 Teraoka ........................... 264/328.8
4,539,171 9/1985 Sorensen ............................ 425/572

FOREIGN PATENT DOCUMENTS
166030 10/1983 Japan ................................. 425/588
233215 10/1987 Japan ................................. 425/588

Primary Examiner—Jay H. Woo
Assistant Examiner—Timothy W. Heitbrink

[57] ABSTRACT

The present invention provides in a stack mold with back to back centrally located mold cavities a multiple sprue bar arrangement including a pair of sprue bars balanced on opposite sides of the mold and connecting bridge across the sprue bars for interfacing to a plastic injector. At least one of the sprue bars provides a plastic flow path from the connecting bridge to the mold cavities.

2 Claims, 2 Drawing Sheets

MULTIPLE SPREW BAR STACK MOLD

FIELD OF THE INVENTION

The present invention relates to stack molds and in particular one by one stack molds having a pair of back to back mold cavities centrally positioned in the stack mold.

BACKGROUND OF THE INVENTION

A stack mold comprises, a center and two outside mold sections which open and close relative to one another to expose the mold cavities for parts ejection. In a typical 2×2 or 4×4 set up the mold cavities are offset from the center of the middle mold section outwardly around the sprue bar which provides a flow path for the injection of plastic to the middle mold section which then divides into branches outwardly to the individual mold cavities.

The above arrangement is objectionable for what is known as a 1 by 1 stack mold, which has back to back mold cavities positioned centrally of the middle mold section. This does not allow the central sprue bar fitting which would have to completely pass through one of the mold cavities to get to other mold cavity.

SUMMARY OF THE PRESENT INVENTION

The present invention relates to a stack mold overcoming the drawbacks noted immediately above with respect to 1 by 1 stack molds, More particularly, the present invention provides a 1 by 1 stack mold with central, and outer mold sections with back to back mold cavities positioned centrally of the middle mold section. The stack mold further includes a pair of sprue bars in a balanced position to opposite sides of the mold extending between the middle and inside mold section. The sprue bars which are preferably positioned diagonally from one another on the mold are connected at their outer ends by a connecting bridge and at their inner ends include inwardly directed branches to the back to back mold cavities. The connecting bridge provides a means of stabilizing the sprue bars and also a means of interfacing them to a plastic injector with at least one of the sprue bars providing a flow path from the injector to the middle mold section.

BRIEF DESCRIPTION OF THE DRAWINGS

The above as well as other advantages and features of the present invention will be described according to the preferred embodiments of the present invention in which.

DETAILED DESCRIPTION ACCORDING TO THE PREFERRED EMBODIMENTS OF THE PRESENT INVENTION

Figure 1:
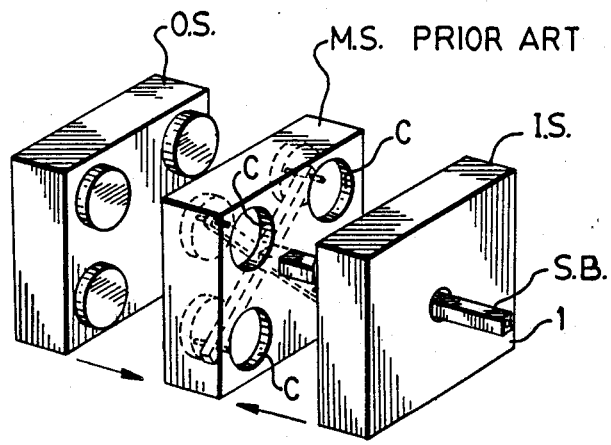
FIG. 1 is an exploded perspective view showing the basic mold construction of a prior art stack mold.

Before describing in detail the embodiments of the present invention reference is made to FIG. 1 showing a conventional prior art mold set up. This mold set up includes a three piece mold body including a stationary outer mold section I.S., a middle mold section M.S. and a moving outside mold section O.S. The middle and moving outside mold sections are opened and closed relative to the stationary outside mold section by means of a rack and pinion gear not shown and not forming part of this invention. The middle section of the mold is moved by the gears to close on the stationary outer mold section and the moving outer mold section moves faster than and closes on the middle mold section as it closes on the stationary outer mold section.

As will be seen in the prior art drawing, the middle mold section includes in total eight mold cavities C, four on each face. This is referred to as a 4 by 4 cavity stack mold. A 2 by 2 mold would include two mold cavities on each face giving a total of four mold cavities. In either the 2 by 2 or the 4 by 4 mold, all of these mold cavities are located outwardly of the center of the middle mold section for balanced operation of the mold.

When the mold is closed, a sprue bar S.B. provides an injection path to the middle mold section from a plastic injector, not shown and once again not forming part of this invention. The sprue bar with its injection path terminates at the center of the middle mold section and then breaks out into branches as shown to feed the individual mold cavities. This center positioning of the sprue bar is required for a balanced feed of the mold cavities away from the center of the middle mold section. The mold body stabilizes the sprue bar which is subject to substantial pressures resulting from the holding pressure of the injector against the sprue bar.

Figure 2:
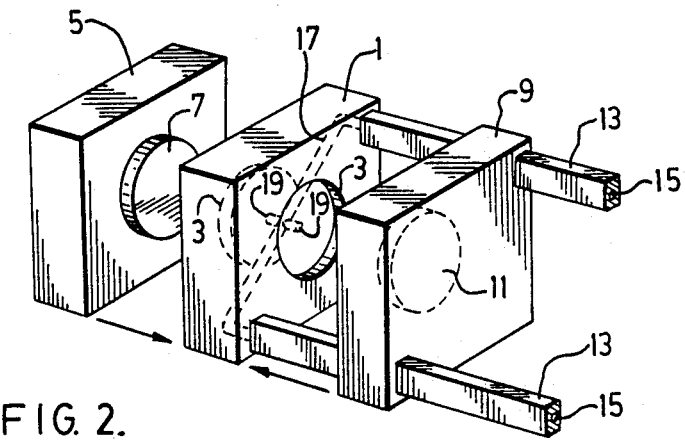
FIG. 2 is an exploded perspective view showing the basic component parts of a multiple sprue bar stack mold according to a preferred embodiment of the present invention.
Figure 3:
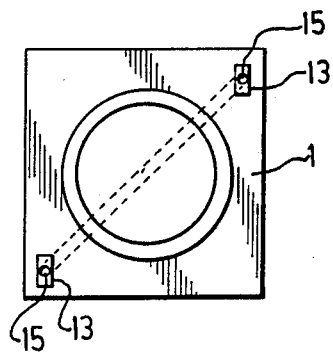
FIG. 3 is a plan view of the middle mold part of the stack mold of FIG. 2.

A single sprue bar arrangement as described above is not workable with a 1 by 1 mold as shown in FIG. 2 of the drawings. This 1 by 1 stack mold as built in accordance with the present invention, comprises a middle mold section 1, an outside moving mold section 5 and an outside stationary mold section 9. Middle mold section 1 includes back to back mold cavities 3 positioned centrally of the middle mold section. The outside section 5 includes a male piece shaping member 7 and the outside mold section 9 includes a male piece shaping member 11, both of which fit into the mold cavities 3 of the middle section.

Figure 5:
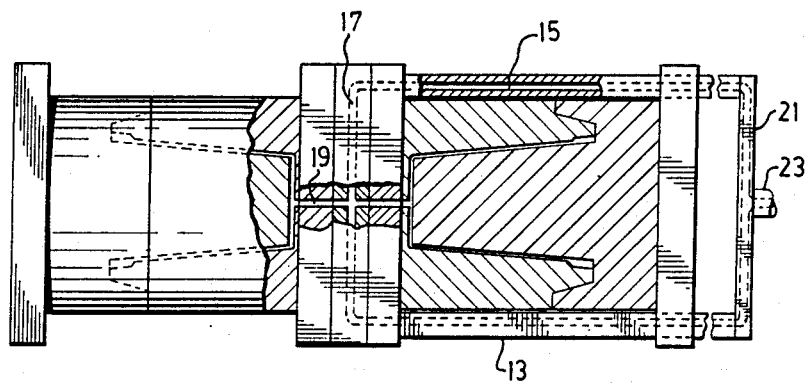
FIG. 5 is a sectional view of the stack mold of FIG. 4.

As will be seen, due to the central positioning of the mold cavities 3, it is not feasible to locate a sprue bar with a plastic feed path at this point because that single sprue bar would have to go completely through one to reach the other mold cavity. Therefore, in accordance with the present invention the mold is constructed with multiple and in this case two sprue bars 13. Each of these sprue bars is provided with an injection path 15 meeting with a common branch 17 passing internally through the middle mold section 1. Branch 17 in turn feeds to a pair of oppositely facing injection nozzles 19 feeding directly into the two mold cavities 3. The details of this feed and the flow along the two sprue bars is best seen in FIG. 5 of the drawings.

Figure 4:
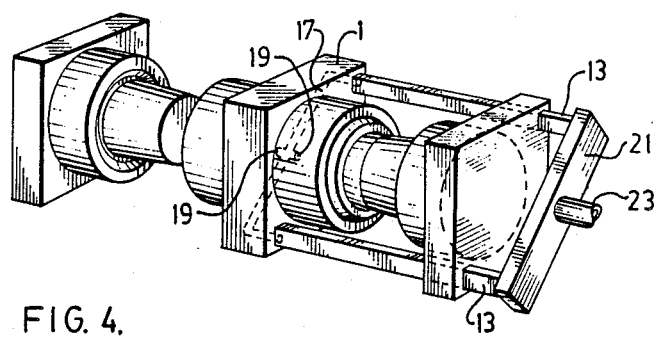
FIG. 4 is a more detailed perspective view of the multiple sprue bar stack mold of FIG. 2.

FIG. 4 of the drawings shows a connecting member or bridge 21 across the two sprue bars 13. This connecting bridge has a single plastic receiving inlet 23 and an internal plastic flow path across the bridge into the two sprue bars. By using this set up, the stack mold will interface directly to a conventional injector with a single feed point and therefore requires little if any modification to the injector itself.

One of the features to the present invention is the positioning of the two sprue bars 13. More particularly, these two sprue bars are located in balanced positions on opposite sides of both the middle and the stationary outside mold sections. The particular set up as shown where the two sprue bars are located at diagonally opposite corners of the mold makes best use of the maximum mold frame area for receiving the two sprue bars, i.e. the corner regions of the mold sections present the maximum frame area for receiving the sprue bars and do not interfere with either the male shaping pieces or the mold cavities in the mold.

The overall balancing of the multiple sprue bar arrangement is important for a number of reasons. Firstly, the balanced support provided by the bridge across the sprue bars ensures stabilization of the system against the substantial pressures experienced during the injection of the plastic material. Secondly, the set up allows the use of both sprue bars as a means of feeding the 1 by 1 mold cavities and once again because of the balanced set up there is an even flow of plastic across the bridge and down the two sprue bars. However, it is to be appreciated that the system can also be operated where only one of the sprue bars includes a flow path and the other sprue bar acts soley as a balanced support for the bridge where the bridge once again provides a means of connecting the sprue bar off set from the center of the mold with a standard centrally positioned plastic injection nozzle.

It will now be seen how the problems of building a 1 by 1 stack mold not readily adaptable to receive a single sprue bar have been overcome in accordance with the present invention by providing bridged multiple sprue bars outwardly of the center of the mold and then feeding back to the centrally positioned 1 by 1 mold cavities.

Although various preferred embodiments of the invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A one by one stack mold with a middle mold section and first and second outside mold sections, said middle and first outside mold sections being movable relative to said second outside mold section, said middle mold section being provided with centrally positioned back to back mold cavities, said stack mold including a pair of sprue bars in balanced positions on opposite sides of said back to back mold cavities extending between said middle and said second outside mold sections, both of said sprue bars having flow paths therethrough and both of said flow paths terminating in a common inwardly directed feed passage which directs molten plastic material simultaneously to both of said back to back mold cavities so that in the event that one of said sprue bars becomes blocked, the other of said sprue bars continues to allow simultaneous flow of said molten plastic material to both of said back to back mold cavities and a bridge member across said pair of said sprue bars, said bridge member being interfacable* with a standard plastic injection nozzle and having an internal channel therethrough to both of said sprue bars.

2. A 1 by 1 stack mold as claimed in claim 1, wherein said sprue bars are located at diagonally opposite corners of said middle and said second outside mold sections.

* * * * *